US007505837B2

United States Patent
Somos

(10) Patent No.: US 7,505,837 B2
(45) Date of Patent: Mar. 17, 2009

(54) METHOD AND APPARATUS FOR LINKING TO A VEHICLE DIAGNOSTIC SYSTEM

(75) Inventor: Neil Somos, Brecksville, OH (US)

(73) Assignee: SPX Corporation, Charlotte, NC (US)

( * ) Notice: Subject to any disclaimer, the term of this patent is extended or adjusted under 35 U.S.C. 154(b) by 623 days.

(21) Appl. No.: 11/024,465

(22) Filed: Dec. 30, 2004

(65) Prior Publication Data

US 2006/0149437 A1 Jul. 6, 2006

(51) Int. Cl.
- *G01M 17/00* (2006.01)
- *G06F 7/00* (2006.01)
- *G06F 19/00* (2006.01)

(52) U.S. Cl. .............. 701/29; 701/32; 701/33; 701/34; 701/35; 702/108; 235/472.01; 235/472.03; 709/230; 714/708; 375/225; 73/FOR. 116; 73/FOR. 110

(58) Field of Classification Search .......... 701/29, 701/32–35, 183; 702/66, 117.3, 108; 235/1–495; 709/230; 714/708; 375/225; 73/FOR. 116, 73/FOR. 110

See application file for complete search history.

(56) References Cited

U.S. PATENT DOCUMENTS

| | | | |
|---|---|---|---|
| 3,772,657 A * | 11/1973 | Marsalka et al. | 714/48 |
| 4,093,981 A * | 6/1978 | McAllister et al. | 714/4 |
| 4,288,658 A * | 9/1981 | Bieber et al. | 178/3 |
| 4,516,201 A * | 5/1985 | Warren et al. | 709/234 |
| 4,748,843 A * | 6/1988 | Schafer et al. | 73/117.3 |
| 4,853,850 A * | 8/1989 | Krass et al. | 701/35 |

(Continued)

OTHER PUBLICATIONS

"Road Vehicles—Diagnostics on Controller Area Network (CAN)—Part 4: Requirements for emissions-related systems", ISOTC 22/SC3, Date: Feb. 13, 2004, ISO/FDIS 15765-4:2004(E), ISOTC 22/SC 3/WG 1, Secretariat: Fakra.

*Primary Examiner*—Khoi Tran
*Assistant Examiner*—Jorge O Peche
(74) *Attorney, Agent, or Firm*—Baker & Hostetler LLP

(57) ABSTRACT

Exemplary embodiments of the present invention relate generally to an improved off-board tool for communicating with a vehicle diagnostic system using a CAN communications protocol. In one exemplary embodiment, an off-board tool having an executable program for linking the off-board tool to a vehicle diagnostic system is provided. The program includes code for transmitting a first message, having a first length from the off-board tool to the vehicle diagnostic system and code for determining whether an acknowledgment receipt of the first message is received by the off-board tool from the vehicle diagnostic system. The program further includes code for transmitting a second message, having a second length, from the off-board tool to the vehicle diagnostic system if the acknowledgement receipt of the first message is not received by the off-board tool. Another exemplary embodiment provides a method for linking an off-board tool to a vehicle diagnostic system. The method includes transmitting a first message, having a first ID length including a first predetermined number of bits, from the off-board tool to the vehicle diagnostic system and determining whether an acknowledgment receipt of the first message is received by the off-board tool from the vehicle diagnostic system. The method further includes transmitting a second message, having a second ID length including a second predetermined number of bits, from the off-board tool to the vehicle diagnostic system if the acknowledgement receipt of the first message is not received by the off-board tool.

13 Claims, 2 Drawing Sheets

U.S. PATENT DOCUMENTS

| | | | |
|---|---|---|---|
| 5,101,501 A * | 3/1992 | Gilhousen et al. | 455/442 |
| 5,278,759 A * | 1/1994 | Berra et al. | 701/1 |
| 5,659,569 A * | 8/1997 | Padovani et al. | 370/479 |
| 5,933,781 A * | 8/1999 | Willenegger et al. | 455/522 |
| 6,324,044 B1 | 11/2001 | Teggatz et al. | 361/119 |
| 6,625,226 B1 * | 9/2003 | Gersho et al. | 375/285 |
| 7,080,788 B2 * | 7/2006 | Koenck et al. | 235/472.01 |
| 7,175,092 B2 * | 2/2007 | Pettinelli et al. | 235/462.4 |
| 2002/0049536 A1 * | 4/2002 | Gaal | 701/213 |
| 2003/0100298 A1 * | 5/2003 | Butler | 455/422 |
| 2003/0145121 A1 | 7/2003 | Watkins | 709/250 |
| 2003/0217313 A1 * | 11/2003 | Pfeiffer et al. | 714/719 |
| 2003/0226065 A1 | 12/2003 | Shingaki | 714/43 |
| 2004/0031856 A1 * | 2/2004 | Atsmon et al. | 235/492 |
| 2004/0042401 A1 | 3/2004 | Itoi | 370/235 |
| 2005/0068520 A1 * | 3/2005 | Beimers et al. | 356/72 |
| 2005/0259670 A1 * | 11/2005 | Anderson et al. | 370/401 |

* cited by examiner

METHOD AND APPARATUS FOR LINKING TO A VEHICLE DIAGNOSTIC SYSTEM

The present invention relates generally to the field of electronic testing devices, and more specifically to an improved "off-board tool," such as a scan tool. It will be appreciated, however, that the invention is also amenable to other applications.

BACKGROUND

"Off-board tools," such as scan tools and code readers are known in the art and are testing devices that interface with vehicle diagnostic systems to access, display, and/or print vehicle diagnostic information. OBD II (On-Board Diagnostics version II) Scan Tools are one commonly known type of scan tool and are governed by a number of standards, e.g., SAE J1978 Rev. 1988-02 and SAE J1979 Rev. 1997-09. The term "off-board tools" as used herein is primarily used to describe portable diagnostic devices that are temporarily connected to the vehicle; however, the term "off-board tools" includes diagnostic devices wherein a portion of the diagnostic device is permanently connected to the vehicle.

Protocol determination for off-board tools is an automatic (hands off) determination of the communication protocol that the vehicle is using for the OBD II functions. Many vehicles have multiple computer modules making up a vehicle diagnostic system. These computer modules often use different communication protocols. This automatic determination of the communication protocol is specified in a SAE J1978. In section 6.4.1 and 6.4.2 the SAE specifies a procedure for trying four protocols, J1850 PWM, J1850 VPW, ISO, Keyword 200 and CAN, and determining which protocol to use. The SAE also suggests a method for determining the OBD II protocol in J1978 section 6.4.2.

The vehicle diagnostic system includes one or more computer modules, such as, for example, an electronic control unit (ECU), a transmission control unit, and an anti-skid braking system (ABS), which are all in circuit communications. Typically, an access point, such as, a data link connector (DLC) is used to provide access to the vehicle diagnostic system. An off-board tool is connected to the DLC and linked to the vehicle diagnostic system. Upon linking with the vehicle diagnostic system, the off-board tool communicates with the vehicle diagnostic system by transmitting/receiving messages using a communications protocol. Messages (e.g., requests and instructions) are transmitted by the off-board tool to one or more of the computer modules, such as, for example, the ECU. An acknowledgement is transmitted from the computer module (e.g., the ECU) after the message is received. For example, the off-board tool sends a message request (e.g., a request to perform a predetermined function) to the ECU. After receiving the message request, the ECU transmits an acknowledgement message back to the off-board tool. The acknowledgement message acts as a confirmation that the ECU received the message request. The off-board tool enters an error mode if no acknowledgement message is received from the ECU.

As noted above, one of the communications protocols is the CAN protocol. For vehicles that support the CAN protocol, the off-board tool may communicate with the vehicle diagnostic system according to CAN protocol. The messages transmitted between the off-board tool and the vehicle diagnostic system are formatted according to the CAN protocol. Currently, the CAN protocol standards provide that at least certain messages may be formatted to a ID length of either 11-bits or 29-bits. Although the CAN protocol in the vehicle diagnostic systems are designed to acknowledge and interpret both 11-bit and 29-bit ID messages received from an off-board tool, it may be the case that vehicle diagnostic system's running the CAN protocol do not properly acknowledge 11-bit ID messages transmitted by an off-board tool.

SUMMARY

Exemplary embodiments of the present invention relate generally to an improved off-board tool for communicating with a vehicle diagnostic system using a CAN communications protocol. In one exemplary embodiment, an off-board tool having an executable program for linking the off-board tool to a vehicle diagnostic system is provided. The program includes code for transmitting a first message, having a first length from the off-board tool to the vehicle diagnostic system and code for determining whether an acknowledgment receipt of the first message is received by the off-board tool from the vehicle diagnostic system. The program further includes code for transmitting a second message, having a second length, from the off-board tool to the vehicle diagnostic system if the acknowledgement receipt of the first message is not received by the off-board tool.

Another exemplary embodiment provides a method for linking an off-board tool to a vehicle diagnostic system. The method includes transmitting a first message, having a first ID length including a first predetermined number of bits, from the off-board tool to the vehicle diagnostic system and determining whether an acknowledgment receipt of the first message is received by the off-board tool from the vehicle diagnostic system. The method further includes transmitting a second message, having a second ID length including a second predetermined number of ID bits, from the off-board tool to the vehicle diagnostic system if the acknowledgement receipt of the first message is not received by the off-board tool.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify principles of this invention, wherein.

DETAILED DESCRIPTION OF ILLUSTRATED EMBODIMENT

Figure 1:
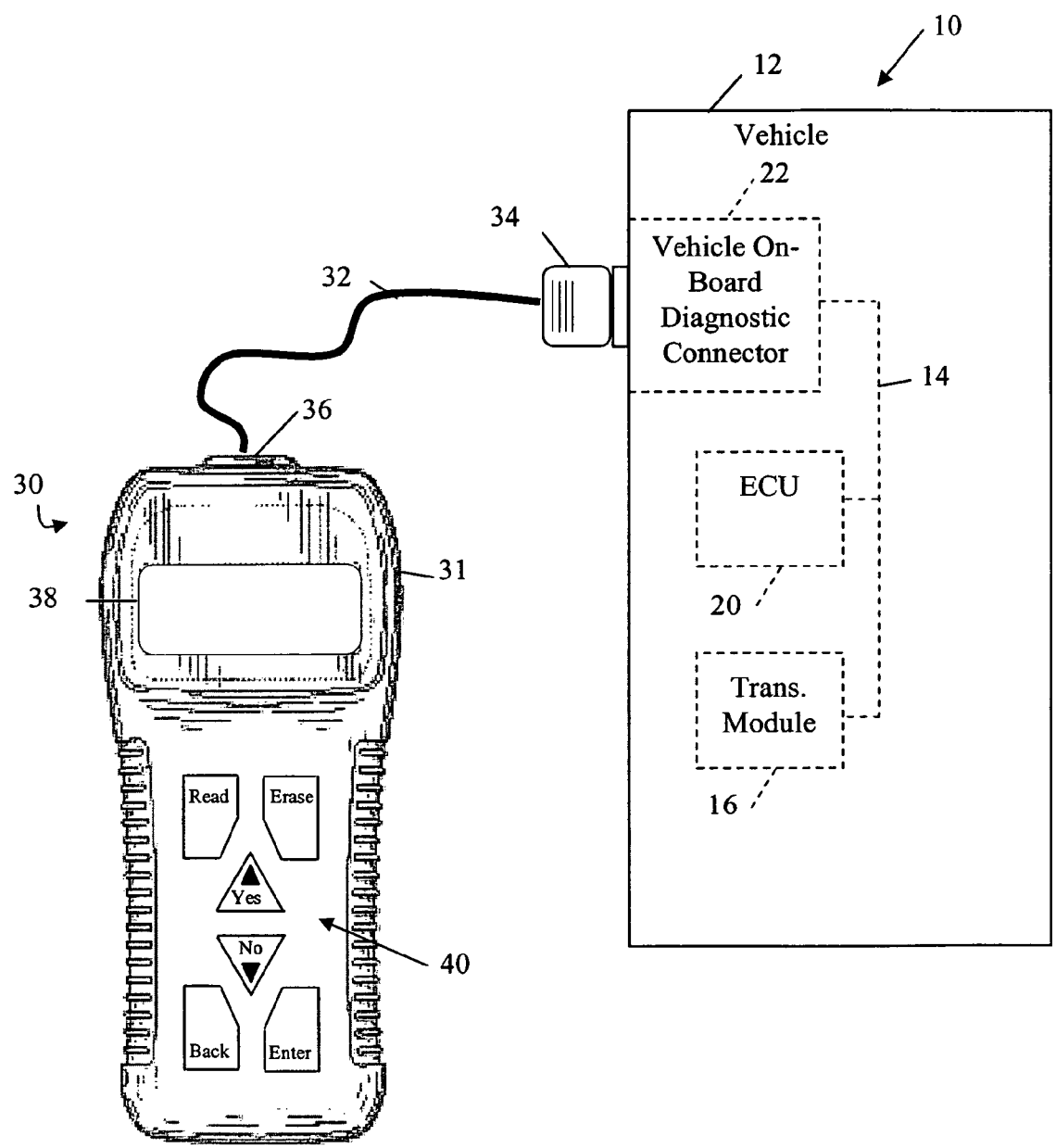
FIG. 1 illustrates a high level block diagram of an off-board tool connected to a vehicle diagnostic system in accordance with one exemplary embodiment of the present invention.

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication. Also, as used herein, voltages and values representing digitized voltages are considered to be equivalent for the purposes of this application and thus the term "voltage" as used herein refers to either a signal, or a value in a processor representing a signal, or a value in a processor determined from a value representing a signal.

"Software", as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" is used interchangeably with processor and may be one of virtually any number of processor systems and/or stand-alone processors, such as microprocessors, microcontrollers, and digital signal processors, and may have associated therewith, either internally therein or externally in circuit communication therewith, associated RAM, ROM, EPROM, clocks, decoders, memory controllers, and/or interrupt controllers, etc.

"Logic" as used herein includes, but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

With reference to FIG. 1, a simplified component diagram of an exemplary vehicle diagnostic system 10 on a vehicle 12 is illustrated in accordance with one embodiment of the present invention. The vehicle diagnostic system 10 includes a communication bus 14, a first computer module 16 (e.g., transmission module) on the vehicle, a second computer module 20 (e.g., electronic control unit (ECU)) on the vehicle, and a data link connector (DLC) 22. The transmission module 16 and the ECU 20 communicate via the communication bus 14.

Connected to the vehicle diagnostic system 10 is an off-board tool 30, such as, for example, a scan tool. The off-board tool (OBT) 30 is connectable to the vehicle diagnostic system 10 via the DLC 22, cable 32 and connectors 34, 36. Cable 32 includes a first connector 34, preferably a Data Link Connector (DLC), such as, for example, a J1692 connector, and a second connector 36. Second connector 36 can be any type of connector and is preferably releasably connectable to the OBT 30. Preferably, cable 32 is releasably connectable, or detachable, so that the cable can be easily replaced if damaged, or removed from the OBT 30 for storage. Optionally, cable 32 can be replaced with wireless transmitters and receivers. In such a case, wireless communication circuitry is connected to the vehicle diagnostic system 10. Preferably, the wireless communication circuitry is removably connectable to the DLC 22. Optionally, wireless communication circuitry can be permanently installed in the vehicle and accessed remotely by OBT 30. Wireless communications circuitry is may also connected to OBT 30, or optionally integrated into OBT 30.

OBT 30 can be any type of off-board tool, such as, for example, a scan tool or code reader, and includes a housing 31, a processor (not shown), an input 40 and a user display 38. The input 40 can be any type of input, such as for example, a touch screen, push buttons, or selector switches. In addition, display 38 can be any type of display, such as, for example, a liquid crystal display, binary displays, such as LEDs, textual displays, such as n character by m line LCD or plasma displays.

OBT 30 is configured to communicate with the vehicle using any number of communications protocols and baud rates, including but not limited to the CAN protocol. In addition, OBT 30 may communicate in the CAN protocol using 11 bit ID messages and 29 bit ID messages. The processor executes code or logic to perform the various tasks and linking described herein.

Figure 2:
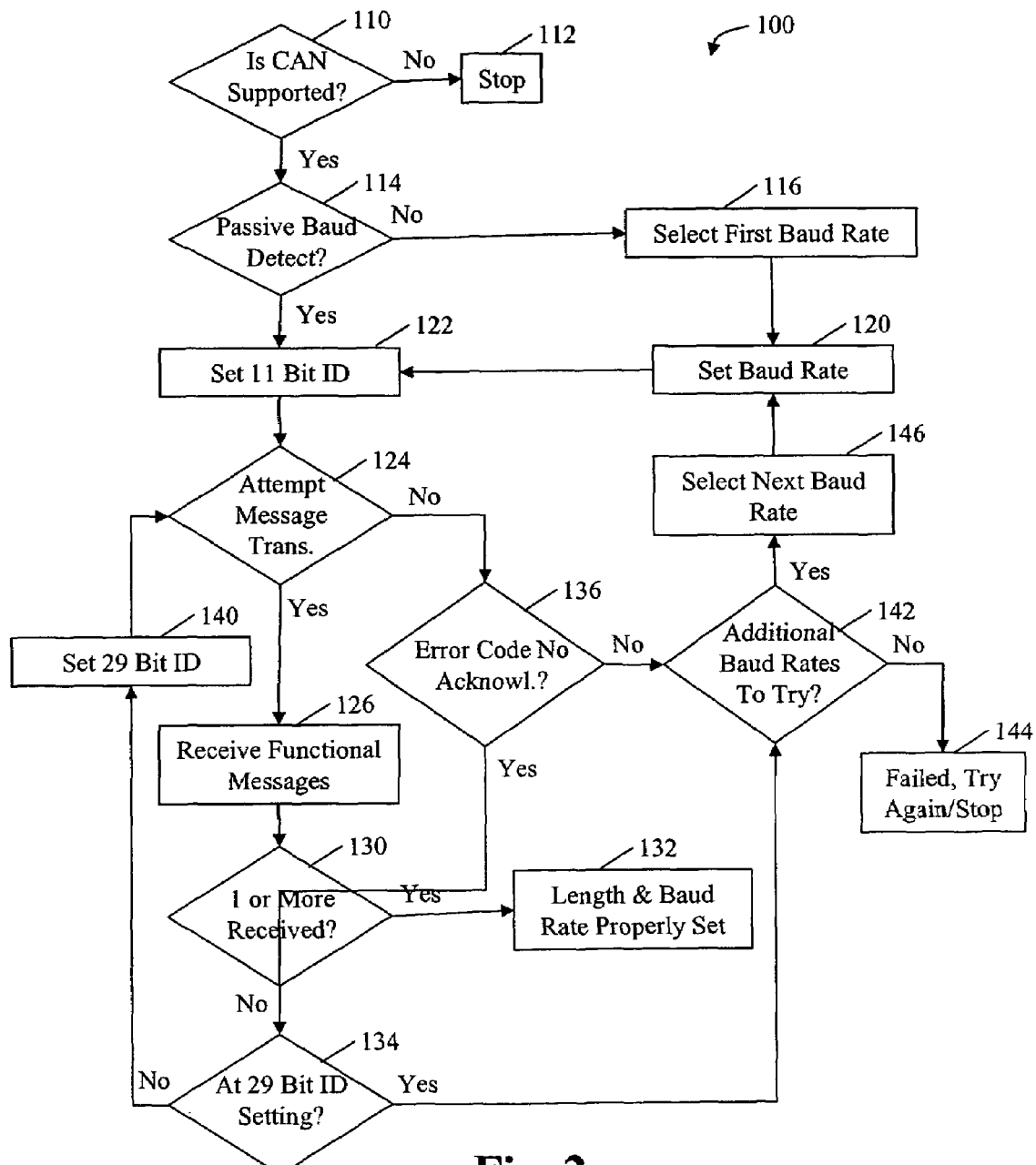
FIG. 2 is an exemplary methodology of linking an off-board tool to a vehicle diagnostic system in accordance with one embodiment of the present invention.

With reference to FIG. 2, an exemplary methodology 100 of linking an OBT to a vehicle diagnostic system is illustrated in accordance with one embodiment of the present invention. For purposes of explanation, it is to be understood that the electronic devices linked according to the methodology discussed with respect to FIG. 2 are a computer module on the vehicle diagnostic system, such as, for example, the ECU 20 and an OBT 30. However, it is to be understood that the linking methodology may be used for linking any two (2) electronic devices communicating via the vehicle diagnostic system 10 using CAN protocol.

The blocks shown and described herein represent functions, actions or events performed therein. If embodied in software, each block may represent a module, segment or portion of code that comprises one or more executable instructions to implement the specified logical function(s). If embodied in hardware, each block may represent one or more circuits or other electronic devices to implement the specified logical function(s). It will be appreciated that computer software applications involve dynamic and flexible processes such that the functions, actions or events performed by the software and/or the hardware can be performed in other sequences different than the one shown.

In one exemplary embodiment, the methodology 100 shown in FIG. 2 is incorporated into a routine within a computer readable medium (e.g., a software program "burned" into a data chip on the OBT). Optionally, the routine is stored on a computer readable medium such as a CD-ROM, a floppy diskette, flash memory, EPROM, ROM, or any other storage medium. When executed, the routine causes data signals to be generated and transmitted between an OBT 30 and the vehicle diagnostic system 10 via the communication bus 14 for performing a methodology for linking to a vehicle diagnostic system as outlined in FIG. 2. Optionally, the OBT 30 can be replaced with any processor based system, such as, for example, a lap top computer.

With reference to FIGS. 1 and 2, an OBT 30 is connected to a vehicle diagnostic system and a determination is made in block 110 whether the CAN protocol is supported by the OBT hardware. If it is determined in the block 110 that the OBT hardware does not support CAN protocol, the methodology stops at block 112. If it is determined at block 110 that the OBT 30 hardware supports the CAN protocol, control passes to block 114 for determining whether a passive baud rate of the vehicle diagnostic system is detected. Determining whether a passive baud rate is detected can be accomplished by, for example, determining that the hardware supports listening without any acknowledgments. In one embodiment, baud rates are selected from a table and the tool waits until an error is noted, a successful message is received, or a timeout period expires. Unless a successful message is received, a subsequent baud rate is selected from the table. If there are no more baud rates in the table, then the passive baud determination has failed. Optionally, the baud rates in the table are retried if the passive baud determination has failed.

If it is determined at block 114 that a passive baud rate is not detected, control passes to block 116 for selecting a first baud rate. The first baud rate may be selected by indexing into a table of baud rates to be tried. The first baud rate to be selected may be the first baud rate in the table. Control passes to block 120 for setting the baud rate of the OBT 30 to the selected baud rate (e.g., the first baud rate). Once the first baud rate is set, control passes to block 122 for setting (configuring) the OBT 30 to communicate with the computer modules on the vehicle diagnostic system using messages having an 11-bit ID format. More specifically, the OBT 30 communicates with the computer modules on the vehicle diagnostic system by transmitting/receiving messages that have 11-bit IDs. In addition, the OBT 30 transmits a message to a computer module, such as, for example, the ECU 20 along the communication bus at block 124. The message is intended to establish communication between the OBT 30 and the ECU 20.

A determination is made in block 124 if a functional request message has been successfully sent from the OBT 30 to the ECU 20. If a successful message has been sent, control passes to block 126 for receiving the responses. At block 130 a determination is made as to whether one or more responses are received. If it is determined in the block 130 that at least one functional request response has been received, control passes to block 132 for indicating that the currently selected baud rate and message ID length (i.e. 11-bits) are properly set for communicating with the vehicle diagnostic system. The OBT 30 is set to operate in a first mode so that subsequent messages will be formatted 11-bit IDs and the process is stopped at block 132. If it is determined at block 130 no functional request responses have been received, control passes to block 134, which is described in more detail below.

If at block 124 a determination is made that the functional request message has not been successfully sent from the OBT 30 to the ECU 20, control passes to block 136 for determining whether this is due to "no acknowledgement" (indicating that the ECU 20 were not listening to the messages with the ID length employed) or some other error. If it is determined that the failure is due to "no acknowledgement", control passes to block 134 for determining whether the selected length of the message IDs sent was previously set to 29-bit IDs. Determining whether the selected length of the message IDs has been previously set to 29-bit IDs may be accomplished by, for example, checking static storage.

If it is determined at block 134 that the length of the message has not already been set to 29-bit IDs, control passes to block 140 for setting the length of the message IDs to 29-bits and sending a message to the computer module. Control returns to block 124 for determining whether an acknowledgement receipt message has been received by the OBT 30 from the ECU 20 in response to the message sent to the computer module. If it is determined that an acknowledgement receipt message has been received, control passes to blocks 126, 130, and 132 as described above. In block 132, we conclude that the current settings for ID-length and baud rate are correct for communications with the vehicle. Also, the process is stopped in block 132.

If it is determined at block 134 that the length of the message has already been set to 29-bit IDs, control passes to a block 142 for determining whether any additional baud rates are available that have not yet been tested. Determining whether any more baud rates are available may be accomplished by, for example indexing to the next baud rate in the table. Similarly, if it is determined in block 136 that no acknowledgement messages have been received by the OBT 30 from the ECU 20, control also passes to block 142 for determining if there are additional baud rates to try.

If it is determined at block 142 that no more baud rates are available, control passes to a block 144, which optionally makes at least one more attempt to determine whether any additional subsequent baud rates are available to be tested. Then, if no more baud rates are available, the process is stopped in the block 144. If, on the other hand, it is determined in the block 142 that more baud rates are available, control passes to block 146 for selecting the next baud rate to be tested. Then control passes to block 120 for setting the current baud rate of the OBT 30 to the selected baud rate.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An off-board tool having an executable program stored on a computer-readable medium for linking the off-board tool to a vehicle diagnostic system, the executable program comprising:

code for determining whether the vehicle diagnostic system supports a CAN communications protocol;

code for determining a baud rate of the vehicle diagnostic system, including code for selecting an initial baud rate, code for determining whether the vehicle diagnostic system is operating at the selected baud rate, and code for selecting a subsequent baud rate if the vehicle diagnostic system is not operating at the selected baud rate;

code for transmitting a first message, having a first ID length of 11 bits, from the off-board tool to the vehicle diagnostic system if the vehicle diagnostic system supports the CAN communications protocol;

code for determining whether an acknowledgment receipt of the first message is received by the off-board tool from the vehicle diagnostic system; and code for transmitting a second message, having a second ID length of 29 bits, from the off-board tool to the vehicle diagnostic system if the acknowledgement receipt of the first message is not received by the off-board tool.

2. The off-board tool having an executable program as set forth in claim 1, the executable program further comprising:

code for setting the off-board tool in a first operating mode if the acknowledgment receipt of the first message is received by the off-board tool, the messages transmitted from the off-board tool having the first ID length when the off-board tool is operating in the first mode.

3. The off-board tool having an executable program as set forth in claim 1, the executable program further comprising:
code for determining whether an acknowledgment receipt of the second message is received by the off-board tool from the vehicle diagnostic system.

4. The off-board tool having an executable program as set forth in claim 3, the executable program further comprising:
code for setting the off-board tool in a second operating mode if the acknowledgment receipt of the second message is received by the off-board tool, the messages transmitted from the off-board tool having the second ID length when the off-board tool is operating in the second mode.

5. The off-board tool having an executable program as set forth in claim 1, wherein the off-board tool is a hand-held portable unit.

6. A method for linking an off-board tool to a vehicle diagnostic system comprising:
determining whether the vehicle diagnostic system supports a CAN communications protocol;
determining a baud rate of the vehicle diagnostic system, including selecting an initial baud rate, determining whether the vehicle diagnostic system is operating at the selected baud rate, and selecting a subsequent baud rate if the vehicle diagnostic system is not operating at the selected baud rate;
transmitting a first message, having a first ID length of 11 bits, from the off-board tool to the vehicle diagnostic system if the vehicle diagnostic system supports the CAN communications protocol;
determining whether an acknowledgment receipt of the first message is received by the off-board tool from the vehicle diagnostic system; and
transmitting a second message, having a second ID length of 29 bits, from the off-board tool to the vehicle diagnostic system if the acknowledgement receipt of the first message is not received by the off-board tool.

7. The method as set forth in claim 6, further comprising:
setting the off-board tool in a first operating mode if the acknowledgment receipt of the first message is received by the off-board tool, messages transmitted from the off-board tool having the first ID length when the off-board tool is operating in the first mode.

8. The method as set forth in claim 6, further comprising:
determining whether an acknowledgment receipt of the second message is received by the off-board tool from the vehicle diagnostic system.

9. The method as set forth in claim 8, further comprising:
setting the off-board tool in a second operating mode if the acknowledgment receipt of the second message is received by the off-board tool, messages transmitted from the off-board tool having the second ID length when the off-board tool is operating in the second mode.

10. The method as set forth in claim 6, wherein:
transmitting the first message includes:
setting the length of the first message ID to 11-bits; and
transmitting the second message includes:
setting the length of the second message ID to 29-bits.

11. An off-board tool for communicating with a vehicle diagnostic system comprising:
a housing having a vehicle data cable connector;
a memory;
an input;
a display;
a processor, coupled to the memory, the input, the display and the data cable connector, configured to execute bit set logic within the memory for determining whether the vehicle diagnostic system supports a CAN communications protocol, for communicating with the vehicle diagnostic system using a first ID bit length of 11 bits if the vehicle diagnostic system supports the CAN communications protocol, for waiting for a response from the vehicle diagnostic system, and for communicating with the vehicle diagnostic system using a second ID bit length of 29 bits if there is no acknowledgement receipt to the communication using the first ID bit; and
baud rate selection logic, coupled to the processor, for selecting an initial baud rate and for selecting a subsequent baud rate if the vehicle diagnostic system does not provide an acknowledgement receipt to a message request using the first ID bit length.

12. The off-board tool of claim 11 wherein the bit set logic sets the off-board tool to communicate with the vehicle diagnostic system using a first ID bit length if the vehicle diagnostic system provides an acknowledgement receipt to a message request using the first ID bit length.

13. The off-board tool of claim 12 wherein the bit set logic sets the off-board tool to communicate with the vehicle diagnostic system using a second ID bit length if the vehicle diagnostic system does not provide an acknowledgement receipt to a message request using the first ID bit length.

* * * * *

UNITED STATES PATENT AND TRADEMARK OFFICE
CERTIFICATE OF CORRECTION

PATENT NO.        : 7,505,837 B2                                               Page 1 of 1
APPLICATION NO. : 11/024465
DATED             : March 17, 2009
INVENTOR(S)       : Neil Somos It is certified that error appears in the above-identified patent and that said Letters Patent is hereby corrected as shown below:

<u>Column 8, line 29</u>
Please replace "ID bit" with --ID bit length--.

Signed and Sealed this

Fourteenth Day of April, 2009

JOHN DOLL
*Acting Director of the United States Patent and Trademark Office*